Figure 1:
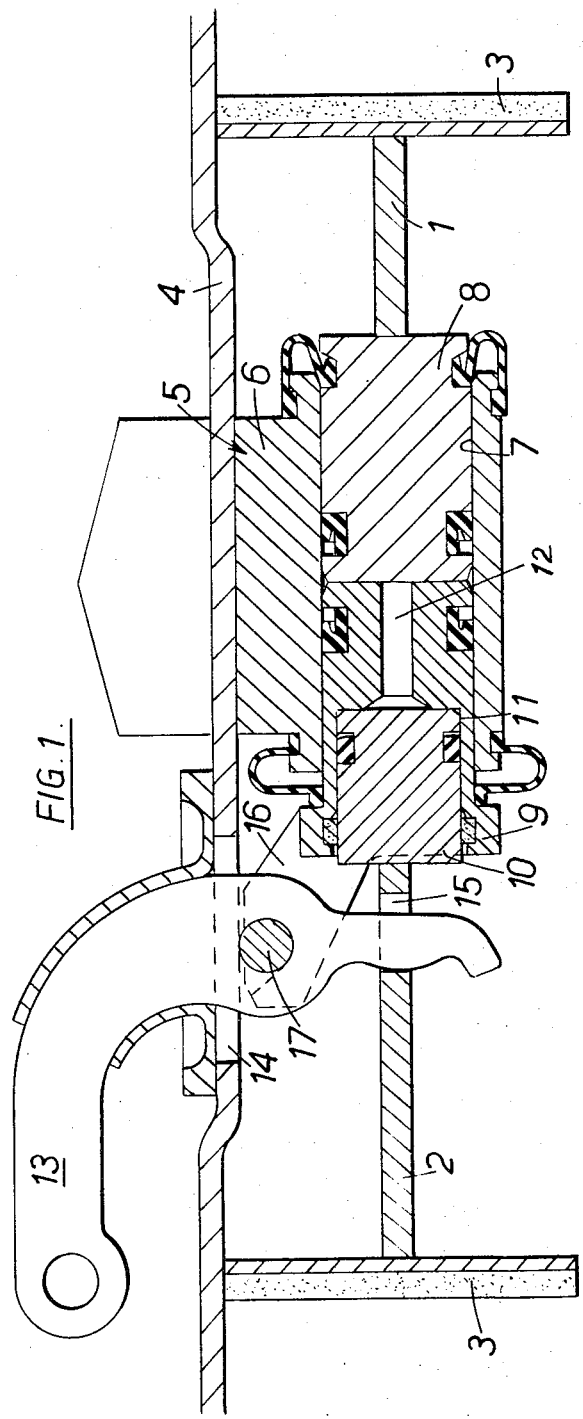

United States Patent
Farr

[11] 3,811,539
[45] May 21, 1974

[54] INTERNAL SHOE-DRUM BRAKES

[75] Inventor: Glyn Phillip Reginald Farr, Kenilworth, England

[73] Assignee: Girling Limited, Tyseley, Birmingham, England

[22] Filed: Nov. 6, 1972

[21] Appl. No.: 303,929

[30] Foreign Application Priority Data
Nov. 12, 1971   Great Britain.................... 52569/71

[52] U.S. Cl............ 188/106 A, 188/196 D, 188/364
[51] Int. Cl.............................................. F16d 65/16
[58] Field of Search........... 188/106 A, 106 F, 363, 188/364, 325, 196 D, 79.5 GE, 106 P

[56]       References Cited
           UNITED STATES PATENTS
3,709,334   1/1973   Kondo et al................... 188/106 A
3,599,763   8/1971   Bailey............................... 188/364
3,581,847   6/1971   Torii et al......................... 188/106 F
3,245,501   4/1966   Dudley............................. 188/106 A
2,140,750   12/1938  Kliesrath.......................... 188/106 A
2,253,205   8/1941   Eksergian ........................ 188/106 A
1,696,729   12/1928  Rackham......................... 188/106 A Primary Examiner—Duane A. Reger
Assistant Examiner—Galen L. Barefoot
Attorney, Agent, or Firm—Scrivener Parker Scrivener & Clarke

[57]              ABSTRACT

In an internal shoe-drum brake a first and second pair of pistons working in a double ended hydraulic cylinder act to separate the shoes for normal service braking. A lever acting on one shoe is pivotally connected to a third piston which is interposed between the first and second pistons and acts on the other shoe through the second piston when the lever is moved angularly in a brake applying direction about its pivotal connection with the third piston.

14 Claims, 2 Drawing Figures

INTERNAL SHOE-DRUM BRAKES

This invention relates to internal shoe-drum brakes of the kind in which a pair of arcuate shoes mounted on a stationary backplate are separated at adjacent actuated ends for normal service braking by an hydraulic actuator and for parking or emergency braking the adjacent actuated shoe ends are separated by a lever which acts on one shoe and indirectly on the other shoe.

When the brake comprises a brake of the one leading one trailing shoe type the non-actuated shoe ends remote from the actuator fulcrum on a fixed abutment on the backplate and when the brake is of the duo-servo type the non-actuated shoe ends are articulated or otherwise coupled together.

In one known brake of the kind set forth the hydraulic actuator comprises a single-ended piston and cylinder assembly mounted to slide in a slot in the backplate between the actuated shoe ends and the lever is pivotally connected to the cylinder. Thus, for parking or emergency braking, the lever applies one shoe directly to a rotatable drum, and the reaction of the lever on the cylinder causes the cylinder to slide with respect to the backplate and apply the other shoe to the drum.

In another type of brake the hydraulic actuator comprises a double ended cylinder fixed to the backplate in which work a pair of opposed pistons and the lever is pivotally connected to the backplate, acting directly on one shoe and indirectly on the other shoe through a strut which is chordal to the drum.

In order to conserve space, simplify the construction and improve the efficiency of brake application it is desirable to combine the lever with an hydraulic actuator of the type comprising a double ended hydraulic cylinder fixed to the backpte and in which a pair of pistons work. However, difficulties arise in such a construction if the lever is pivotally connected to one of the pistons so that the other shoe is applied to the drum through a strut member defined by abutment of the pistons. Should the hydraulic actuator and the lever be operated simultaneously, the force applied to the pistons by the lever is resisted and opposed by a force generated by hydraulic pressure tending to separate the pistons which work in the cylinder.

According to our invention in an internal shoedrum brake of the kind set forth the hydraulic actuator comprises a double-ended cylinder fixed on the backplate between the actuated shoe ends, and a pair of first and second opposed pistons for engagement with the shoes adapted to work in the cylinder and adapted to be urged away from each other to separate the actuated shoe ends for normal service braking, and the lever is pivotally connected to a third piston which is interposed between the first and second pistons and acts on the said other shoe through the second piston to apply that shoe to the drum when the lever is moved angularly in a brake applying direction about its pivotal connection with the third piston.

Conveniently the first piston works in an axial bore in the third piston, and the bore is connected to a space between adjacent ends of the third and second pistons through a passage in the third piston.

Should the hydraulic actuator and the lever be operated simultaneously the reaction force applied by the lever to the third piston is opposed by a relatively small force equal in magnitude to the hydraulic pressure acting over an area equal to the difference in areas between the first piston and the third piston.

Preferably, therefore, the relative sizes of the first and third pistons are chosen to reduce to a minimum the magnitude of the force opposing operation of the lever whereby movement of the third piston with respect to the cylinder during normal service operation is reduced to a minimum. In such a construction the first and second pistons are equal in area so that the third piston remains substantially stationary during normal service braking.

Our invention has the advantage that an adjuster carrying the hand brake load can be incorporated between the pistons to compensate automatically for wear of the friction linings carried by the shoes. Conveniently, such an automatic adjuster acts through the third piston and between the first and second pistons, and is protected fully against the ingress of moisture, dirt and other injurous foreign matter.

Figure 2:
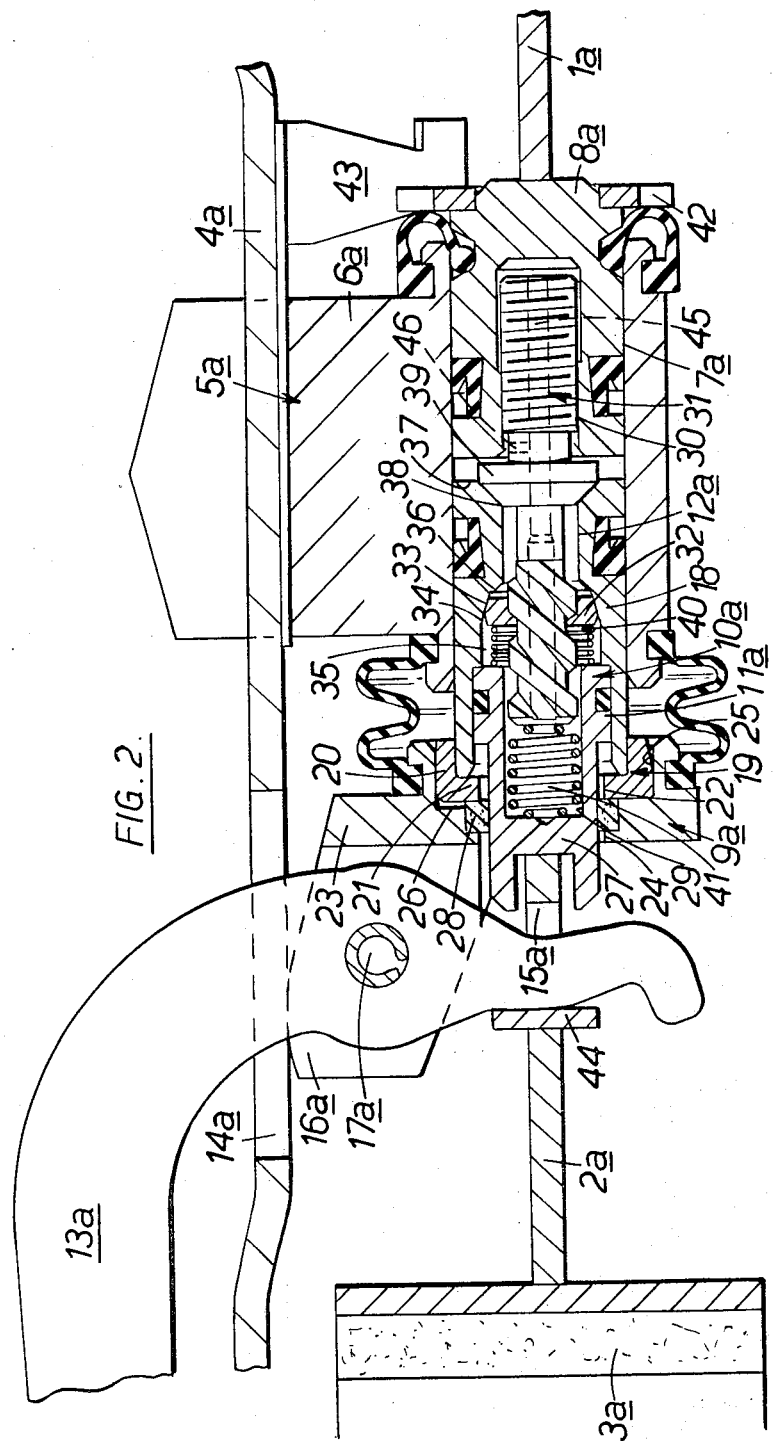

Two embodiments of our invention are illustrated in the accompanying drawings in which:

FIG. 1 is a section through a combined hydraulic and mechanical actuator assembly mounted between adjacent actuated shoe ends of an internal shoe drum brake; and FIG. 2 is a section similar to FIG. 1 but showing a modified construction incorporating an automatic adjuster.

In the shoe drum brake illustrated in FIG. 1 a pair of arcuate shoes 1, 2 carrying friction linings 3 for engagement with a rotatable drum (not shown) are mounted on a stationary backplate 4. Adjacent actuated shoe ends are adapted to be separated to apply the brake by a combined hydraulic and mechanical actuator assembly 5. At their opposite non-actuated ends the shoes are adapted to fulcrum on a fixed abutment in the backplate or are coupled or otherwise articulated together conveniently by means of a strut of which the effective length may be adjustable.

The actuator assembly 5 combines an hydraulic cylinder 6 which is secured to the inner face of the backplate 4, between the actuated shoe ends. The cylinder 6 has an open-ended longitudinally extendng throughbore 7 in which work a pair of opposed pistons 8 and 9. A further piston 10 works in a bore 11 in the outer end of the piston 9, and the inner end of the bore 11 is connected to a space between adjacent inner ends of the pistons 8 and 9 through an axially extending passage 12 communicating with the inner end of the bore 11.

In an off position of the brake shown in the drawing the adjacent ends of the pistons 8 and 9 are in engagement, and the inner end of the piston 10 engages with a stop defined by the base of the bore 11. In this position the piston 10 projects from the piston 9 by a short distance and engages with the web of the leading or primary shoe 2. The piston 8 engages with the web of the trailing or secondary shoe 1.

For normal service braking hydraulic fluid under pressure is supplied between adjacent ends of the pistons 8 and 9, and acts on the inner end of the piston 10 through the passage 12. The pistons 10 and 8 move outwardly to separate the adjacent shoe ends. The piston 9 moves away from the piston 8 as it is subjected to a force in that direction equal to the pressure of the hydraulic fluid acting over an area equal to the full area of the piston 9 minus the area of the bore 11.

One arm of a mechanical brake applying lever in the form of a bell crank 13 projects into the brake through an opening 14 in the backplate 4 and at its inner end, which is reduced in width, is received in an elongate opening 15 in the web of the shoe 2. The chordal length of the opening 15 is chosen so that the web does not normally contact the lever when the shoe 2 is applied to the drum by the hydraulic cylinder 6. Thus the lever 13 is not affected during normal service braking.

The piston 9 comprises a carrier for the lever 13 and is formed at its outer end with at least one outwardly directed lug 16 which is inclined towards the backplate 4. The lug 16 is located outside the peripheral edge of the piston 10 and terminates within the projected area of the web of the shoe 2, closely adjacent to the opening 14. Adjacent to its inner end the bell crank lever 13 is pivotally connected to the lug 16 by means of a pivot pin 17.

When the brake is applied mechanically for parking or emergency braking, the lever 13 is moved angularly about the pivot pin 17 in a clockwise direction. The inner end of the lever engages with the web of the shoe 2 at the outer end of the slot 15 to urge that shoe into engagement with the drum. The reaction of the lever 13 on the carrier piston 9 urges that piston in the opposite direction towards the end of the bore adjacent to the shoe 1 to apply that shoe to the drum through the piston 8 which acts as a thrust member.

Should the brake be applied hydraulically and mechanically at the same time, the reaction of the lever 13 acting on the carrier piston 9 is resisted by a force equal in magnitude to the hydraulic pressure acting over an area equal to the difference in areas between the pistons 9 and 10. That force is reduced to a minimum by arranging for the diameter of the piston 10 to be only slightly less than that of the piston 9.

The brake illustrated in FIG. 2 of the drawings is a modification of the brake shown in FIG. 1 and corresponding reference numerals qualified by the suffix *a* have been applied to corresponding parts. The brake shown in FIG. 2 incorporates an automatic adjuster to compensate for wear of the friction linings 3a.

In the brake illustrated in FIG. 2 of the drawings the carrier piston 9a is constructed from a three part assembly. The piston 9a comprises a first piston part 18 which works in the bore 7a and which projects at its outer end from the cylinder 6a by a substantial distance. The outer end of the piston part 18 is received within an annular slipper 19. The slipper 19 comprises a sleeve 20 of relatively short axial length in which the piston end is received, and an inwardly directed radial flange 21 which engages with the free end of the piston part 18 and which defines a central aperture 22 of a diameter slightly less than that of the bore 11a in the piston part 18. The outer face of the sleeve 20 converges in a direction away from the flange 21.

A hub member 23 carrying the lug 16a has an open-ended longitudinal bore 24 substantially equal in diameter to the aperture 22. The end of the bore 24 remote from the lug 16a is counterbored at 25 to define a recess in which the slipper 19 is received. In a circumferentially extending region above the common axis of the pistons 8a, 9a, and 10a the recess 25 is deepened so that a clearance 26 is defined between the slipper 19 and the base of the recess when the slipper 19 is in engagement with the region of the base of the recess 25 which is below the common axis of the pistons.

The piston 10a which works in the bore 11a is provided with an outwardly projecting axial extension 27 of a diameter less than that of the hub 23 and the aperture 22 for engagement with the web of the shoe 2a. The extension 27 works through an annular seal 28 housed in a recess in the hub member 23.

The passage 12a, which is increased in diameter, is concentric with longitudinally extending bores 29 and 30 in the piston 10a and the piston 8a respectively, which are substantially equal in diameter to the passage 12a.

A thrust member 31 extends axially through the passage 12a into the bore 29 and has a non-reversible screw-threaded engagement in the bore 30 of the piston 8a. The portion of the thrust member 31 which projects into the bore 29 is screwed into a thrust ring 32.

The peripheral edge of the thrust ring 32 is chamfered at 33 to engage with a complementary chamfer 34 between a counterbore 35 and a shoulder 36 at the step at the change in diameter between the counterbore 35 and the passage 12a. The opposite end of the passage 12a is countersunk to define a chamfer 37 with which a corresponding chamfer 38 on an enlarged head 39 integral with the thrust member 31 is adapted to engage.

The screw-threaded engagement between the thrust member 31 and the thrust ring 32 is in the form of a "fast" thread incorporating a degree of lost motion. Normally the chamfer 33 is urged into the engagement with the chamfer 34 to define inter-engaging clutch faces by means of a compression spring 40 acting between the thrust ring 32 and an adjacent end of the piston 10a. A second compression spring 41, which is stronger than the spring 40, acts between the piston 10a and the adjacent end of the thrust member 31 to urge the thrust member 31 axially and cause sufficient friction to be generated between the screw-threads of the thrust member 31 and the piston 8a for relative rotation to be prevented.

When the brake is applied hydraulically by the application of hydraulic fluid under pressre between adjacent ends of the pistons 8a and 9a and to the piston 10a through a clearance between the thrust member 31 and the passage 12a, the piston 8a is moved outwardly to apply the shoe 1a to the drum. The thrust member 31 is urged to follow the piston 8a by the loading of the spring 41. Simultaneously the pistons 9a and 10a move away from the piston 8a in the opposite direction and the shoe 2a is applied to the drum by the engagement therewith of the piston 10a. During this movement the force of the engagement between the faces 33 and 34 is increased.

The lost-motion in the screw-threaded engagement between the thrust member 31 and the thrust ring 32 defines a minimum braking clearance and is substantially taken up during movement of the pistons as described above in a normal brake application. At the termination of the brake application the parts are restored to the position shown in the drawings under the influence of normal brake-shoe pull-off or return springs.

When the movement of the pistons in the application of the brake due to wear of the friction linings is in excess of the movement required to take up the lost motion that additional movement causes the thrust member 31 to move with the piston 8a with respect to the thrust ring 32. Since the thrust ring 32 is held against rotation relative to the piston 9a, due to the engagement of the clutch faces 33 and 34, the provision of the fast thread causes the thrust member 32 to rotate and unscrew with respect to the piston 8a, thereby increasing the effective length of an assembly comprising the thrust member 31, and the pistons 8a and 9a. At the termination of the brake application the pants are restored to their normal inoperative positions under the influence of the pull-off or return springs, and with the clutch engaging force now decreased, the thrust ring 32 rotates relative to the clutch face 34. The loading of the spring 40 causes the ring 32 to rotate with respect to the thrust member 31, so that the thrust member 31 remains in its adjusted position.

In a modification the spring 41 is omitted and a plastics insert is inserted in the screw-threaded engagement between the piston 8a and the thrust member 31 to prevent relative rotation therebetween except as dictated by the driving action of the thrust ring 32 as described above.

When the brake is re-lined or braking clearances are set initially the effective length of the assembly comprising the thrust member 31 and the pistons 9a and 8a can be adjusted manually by rotation of the piston 8a through a toothed wheel 42 on its outer end. During this operation the thrust member 31 is held against rotation by the engagement of the clutch faces 37 and 38. During normal operation of the adjuster, the toothed wheel 42 is held against rotation by means of a resilient blade 43 engaging between adjacent teeth and clamped between the cylinder 5a and the backplate 4a.

In a modified construction the non-reversible screw threaded engagement is provided between the piston 9a and the thrust member 31, and the fast thread and the thrust ring 32 are housed within the piston 8a.

When the brake is applied in an emergency or for parking the lever 13a acts on the leading or primary shoe 2a through a thrust pad 44, and the trailing or secondary shoe 1a is applied to the drum by the reaction of the lever 13a which is transmitted to that shoe through the piston 9a and 8a, and the thrust member 31.

Since the pivot pin 17a is offset from the centre line of the cylinder 5a and the pistons 9a and 8a, an oblique and offset load is applied to the piston part 18. However, due to the provision of the slipper 19, the hub member 23 is adapted to tilt until the upper edge of the lug or lugs 16a contacts the backplate 4a to react against the component of the lever reaction normal to the backplate 4a. The tilting movement of the hub member 23 takes place about a fulcrum defined by the edge between the two base regions of the recess 25 which intersects the longitudinal centre line of the pistons 9a and 8a. The component of force parallel to the backplate 4a is applied at the fulcrum only. THus any tendency for the piston part 40 to snag in the bore 7a is minimised or reduced substantially. With use the fulcrum will wear or brimell until a rocking surface is formed whereafter wear is minimised.

The slipper 19 is constructed from a relatively hard material, conveniently steel, thereby protecting the piston part 18, which is constructed from a relatively soft alloy material, from damage.

Since the piston 10a is of a diameter greater than that of the aperture 22 there is no danger of that piston being forced out of the piston 18 when the actuator is removed from the brake.

The thrust member 31 is provided with a longitudinally extending passage 45 communicating with a radial passage 46 opening between the pistons 9a and 8a. The passages 45 and 46 improve the bleeding of the cylinder.

The construction and operation of the brake illustrated in FIG. 2 is otherwise the same as that described above with reference to FIG. 1.

I claim:

1. An internal shoe-drum brake comprising a stationary backplate, a rotatable drum, a pair of arcuate shoes carrying friction linings for engagement with said drum mounted on said backplate, said shoes having adjacent actuated ends, an hydraulic actuator for separating said actuated ends for normal service braking, and a lever for separating said actuated ends for parking or emergency braking and acting on one shoe and indirectly on the other shoe, wherein said hydraulic actuator comprises a double-ended hydraulic cylinder fixed on said backplate between said actuated shoe ends, a pair of first and second opposed hydraulic pistons for engagement with said shoes adapted to work in said cylinder and adapted to be urged away from each other to separate said actuated shoe ends for said normal service braking in response to hydraulic fluid under pressure acting on said first and second pistons, and a third piston interposed between said first and second pistons, a pivotal connection being provided between said lever and said third piston whereby said lever acts on said other shoe through said second piston to apply said other shoe to said drum when said lever is moved angularly in a brake applying direction about said pivotal connection with said third piston to act on said one shoe.

2. An internal shoe-drum brake as claimed in claim 1, wherein said third piston is provided with an axial bore in which works said first piston and which is connected to a space in said cylinder between adjacent ends of said third and second pistons through a passage in said third piston.

3. An internal shoe-drum brake as claimed in claim 1 wherein said first piston and said second piston are substantially equal in area whereby said third piston, which is subjected to a force equal in magnitude to hydraulic pressure acting over an area equal to the difference in areas between said first and second pistons, remains substantially stationary during said normal service braking.

4. An internal shoe-drum brake as claimed in claim 1, wherein at least one lug directed towards said backplate is provided on said third piston and said lever is pivotally connected to said lug by means of said pivotal connection.

5. An internal shoe-drum brake as claimed in claim 4, wherein said third piston comprises a one-piece member with which said lug is integral.

6. An internal shoe-drum brake as claimed in claim 4, wherein said third piston comprises a piston-part adapted to work in said cylinder and having an outer end, an annular slipper within which said outer end is received, and an annular hub member encircling said slipper and carrying said lug said hub member and said slipper being so constructed and arranged as to define a rocking engagement therebetween to enable said lug to engage said backplate whereby said piston-part is subjected only to a component of force acting along the longitudinal axis thereof.

7. An internal shoe-drum brake as claimed in claim 6, wherein said slipper comprises a sleeve in which said outer end of said piston-part is received and an inwardly directed radial flange engaging with the free end of said piston-part, engaging faces of said sleeve and said hub member being relatively tapered to permit said hub member to tilt with respect to said slipper about a fulcrum defined by the engagement of said hub member with said flange.

8. An internal shoe-drum brake as claimed in claim 7, wherein said slipper is received in a counterbored recess in said hub member, and said fulcrum comprises a shoulder in said base of the recess lying on the longitudinal axis of said cylinder in a plane parallel with that of said backplate between circumferentially extending regions.

9. An internal shoe-drum brake as claimed in claim 7, wherein said first piston includes an outwardly directed extension of reduced diameter extending through a bore in said hub member for engagement with said one shoe, and said radial flange defines an aperture of a diameter less than that of said first piston to prevent accidental withdrawal of said first piston from said bore.

10. An internal shoe-drum brake as claimed in claim 1, incorporating an adjuster for compensating automatically for wear of said friction linings.

11. An internal shoe-drum brake as claimed in claim 10, wherein said adjuster comprises a thrust member which is rotatable to increase the effective distance between said first and second pistons, a screw-threaded engagement being provided between said thrust member and one piston, and clutch means being disposed between said thrust member and another piston to define a frictional engagement therebetween.

12. An internal shoe-drum brake as claimed in claim 11, wherein said screw-threaded engagement is provided between said thrust member and said second piston, and said clutch means comprises a thrust ring, a screw-threaded engagement between said thrust member and said thrust ring, a clutch face on said third piston, and spring means for urging said thrust ring into frictional engagement with said clutch face.

13. An internal shoe-drum brake as claimed in claim 12, wherein a degree of lost-motion provided in said engagement between said thrust ring and said thrust member defines a minimum braking clearance, and said lost-motion is normally taken up by the action of said spring means.

14. An internal shoe-drum brake as claimed in claim 12, wherein said spring means comprises a first compression spring acting between said thrust ring and said first piston, and a second stronger compression spring acting between said first piston and an adjacent end of said thrust member.

* * * * *